(12) United States Patent (10) Patent No.: US 8,306,557 B2
Iwamura et al. (45) Date of Patent: Nov. 6, 2012

(54) BASE STATION APPARATUS AND METHOD FOR USE IN MOBILE COMMUNICATION SYSTEM

(75) Inventors: Mikio Iwamura, Yokohama (JP); Atsushi Harada, Kawasaki (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 410 days.

(21) Appl. No.: 12/531,628

(22) PCT Filed: Mar. 18, 2008

(86) PCT No.: PCT/JP2008/055000
§ 371 (c)(1),
(2), (4) Date: Nov. 9, 2009

(87) PCT Pub. No.: WO2008/123079
PCT Pub. Date: Oct. 16, 2008

(65) Prior Publication Data
US 2010/0113045 A1  May 6, 2010

(30) Foreign Application Priority Data
Mar. 22, 2007  (JP) .................. 2007-075580

(51) Int. Cl.
 H04W 68/00 (2009.01)
 H04W 36/00 (2009.01)
 H04W 4/00 (2009.01)
 H04B 1/04 (2006.01)
 H04B 1/38 (2006.01)
 H04B 7/185 (2006.01)
 G08C 17/00 (2006.01)
(52) U.S. Cl. .............. 455/458; 455/561; 455/127.5; 455/574; 455/436; 370/311; 370/318; 370/331; 370/332

(58) Field of Classification Search .......... 455/458, 455/561, 127.5, 574, 436–443; 370/331, 370/332, 311, 318
See application file for complete search history.

(56) References Cited

U.S. PATENT DOCUMENTS
6,138,001 A * 10/2000 Nakamura et al. ........... 340/7.35
(Continued)

FOREIGN PATENT DOCUMENTS
JP   05-114883 A   5/1993
(Continued)

OTHER PUBLICATIONS
Patent Abstracts of Japan, Publication No. 2001-036457, dated Feb. 9, 2001, 1 page.
(Continued)

Primary Examiner — Marisol Figueroa
Assistant Examiner — Dung Hong
(74) Attorney, Agent, or Firm — Osha Liang LLP

(57) ABSTRACT

A base station apparatus includes a classification unit configured to classify user apparatuses based on channel state of a radio link, a DRX (Discontinuous Reception) status memory configured to store information indicating which of multiple groups each of one or more of the user apparatuses conducting DRX belongs to, a determination unit configured to determine which of the groups the user apparatuses classified by the classification unit are to belong to with reference to the information stored in the DRX status memory, and an indication unit configured to indicate the determined groups to the user apparatuses. Each of the groups includes one or more of the user apparatuses activating simultaneously. The determination unit is configured to assign one of the user apparatuses having relatively poor channel state to one of the groups having a smaller number of simultaneously activating user apparatuses.

2 Claims, 4 Drawing Sheets

U.S. PATENT DOCUMENTS

| | | | |
|---|---|---|---|
| 6,570,861 B1 * | 5/2003 | Marsan et al. | 370/330 |
| 2004/0152476 A1 * | 8/2004 | Kuwano et al. | 455/459 |
| 2007/0011503 A1 * | 1/2007 | Kitani et al. | 714/704 |
| 2007/0177555 A1 * | 8/2007 | Brueck et al. | 370/338 |
| 2008/0182596 A1 * | 7/2008 | Wang et al. | 455/458 |

FOREIGN PATENT DOCUMENTS

| | | |
|---|---|---|
| JP | 11-055712 A | 2/1999 |
| JP | 11-243590 A | 9/1999 |
| JP | 2001-36457 A | 2/2001 |

OTHER PUBLICATIONS

Patent Abstracts of Japan, Publication No. 11-243590, dated Sep. 7, 1999, 1 page.

Patent Abstracts of Japan, Publication No. 11-055712, dated Feb. 26, 1999, 1 page.

Patent Abstracts of Japan, Publication No. 05-114883, dated May 7, 1993, 1 page.

3GPP TSG-RAN WG2 Meeting #57, R2-070463; St. Louis, USA; Feb. 12-16, 2007, "DRX in E-UTRAN," 4 pages.

3GPP TS 36.300 V1.0.0, Mar. 2007, "Overall description," 82 pages.

International Search Report issued in PCT/JP2008/055000, mailed on Jun. 10, 2008, with translation, 9 pages.

Written Opinion issued in PCT/JP2008/055000, mailed on Jun. 10, 2008, 3 pages.

\* cited by examiner

PRIOR ART

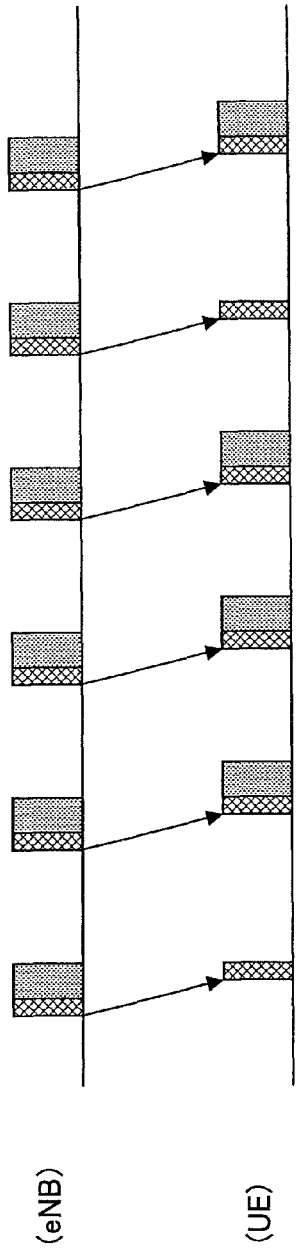
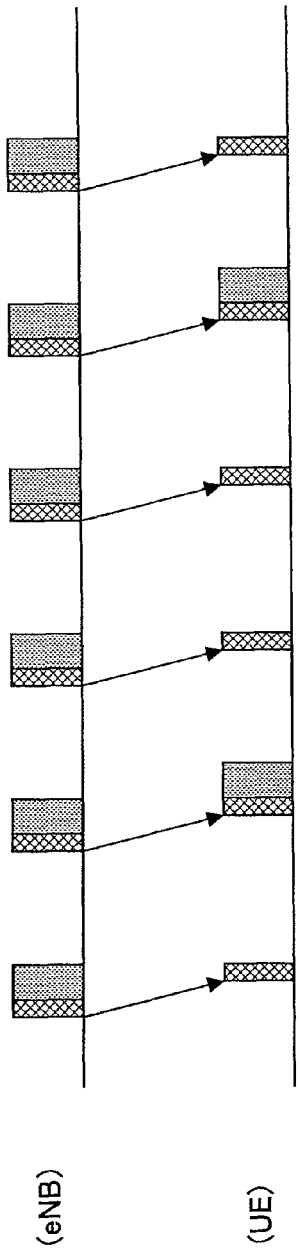
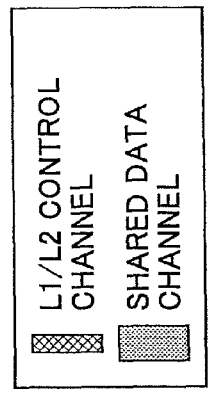
FIG.2
PRIOR ART

| GROUP NUMBER | NUMBER OF UES IN CELL EDGE | TOTAL NUMBER OF UES |
|---|---|---|
| 1 | 2 | 7 |
| 2 | 4 | 6 |
| 3 | 0 | 2 |
| 4 | 1 | 1 |
| ⋮ | ⋮ | ⋮ |
| 10 | 3 | 5 |

BASE STATION APPARATUS AND METHOD FOR USE IN MOBILE COMMUNICATION SYSTEM

TECHNICAL FIELD

The present invention relates to the technical field of mobile communication, and more particularly relates to a base station apparatus and a method for use in a mobile communication system.

BACKGROUND ART

In this technical field, a LTE (Long Term Evolution) scheme is being discussed in a W-CDMA standardization organization 3GPP as a successor communication scheme of a W-CDMA (Wideband-Code Division Multiple Access) scheme, a HSDPA (High Speed Downlink Packet Access) scheme and a HSUPA (High Speed Uplink Packet Access) scheme. In the LTE scheme, an inactive (idle) user apparatus may migrate between cells while performing DRX (Discontinuous Reception) and is managed for each TA (Tracking Area) including one or more cells while maintaining the latest location registration state. On the other hand, a base station conducts DTX (Discontinuous Transmission) in downlinks for that user apparatus so that the user apparatus can conduct the DRX properly. In accordance with the LTE scheme, an active user apparatus may also conduct the DRX as needed mainly in terms of battery energy savings.

A user apparatus conducting the DRX switches between an active state and an inactive state in fixed cycles (DRX cycle) and receives L1/L2 control signals at the cycles. The user apparatus demodulates the L1/L2 control signals and determines whether there is information destined for the user apparatus. The information may include the presence of downlink data, a resource block and a data format such as a data modulation scheme to be used if the downlink data is present, and a resource block and a data format available for the next uplink data transmission. If information destined for the user apparatus is present, the user apparatus may receive downlink data in accordance with the information. Otherwise, the user apparatus may transition from the active state to the inactive state and wait for the next activation timing. In general, a longer DRX cycle leads to greater effect on the battery savings or power consumption. However, it should be noted that the DRX may affect QoS (Quality of Service). Some techniques for setting the DRX cycle for each radio bearer are disclosed in 3GPP R2-070463, Feb. 6, 2007, for example.

Many user apparatuses conducting the DRX can be arranged to activate in different subframes.

FIG. 1 illustrates ten types of activation timing patterns (patterns 1-10) for a certain DRX cycle. User apparatuses conduct the DRX in accordance with any of these patterns. For any pattern, the user apparatus is active during one TTI and inactive during nine TTIs. The many user apparatuses are arranged not to concentrate on a certain pattern. For example, if the user apparatuses are associated with patterns 1-10, patterns 1, 2, . . . , 10 may be cyclically assigned to the user apparatuses. Alternatively, any of patterns 1-10 may be randomly used. Alternatively, a remainder of division of an identification number of a user apparatus by 10, for example, C-RNTI mod 10, may be used as the pattern number. Even in any of the cases, the user apparatuses are distributed over all patterns 1-10.

A limited amount of resources can be used for L1/L2 control channels and data signals, and accordingly a limited number of user apparatuses are allowed (scheduled for) transmissions in a single radio frame. As a result, as illustrated in the upper side of FIG. 2, if a smaller number of user apparatuses belong to a certain pattern, there would be a higher likelihood that resource blocks may be assigned for transmissions of downlink data (shared data channels). On the other hand, as illustrated in the lower side of FIG. 2, if a larger number of user apparatuses belong to a certain pattern, there would be a lower likelihood that resource blocks may be assigned for transmissions of downlink data (shared data channels). If data and control signals desired to be transmitted to a user apparatus at a DRX activation timing are not scheduled, the transmission of the data and control signals destined for the user apparatus would be delayed to the next activation timing.

On the other hand, the user apparatuses ubiquitously reside within a service area and are in various communication environments. Thus, even if the user apparatuses receive the same radio bearer, the user apparatuses may have different channel states and different radio transmission states.

There is a high risk that a user apparatus with a poor channel state, such as a user apparatus residing in a cell boundary, may fail to receive a downlink L1/L2 control signal and a subsequent data signal. If the user apparatus fails to receive the downlink signals, the user apparatus cannot be communicating until the next activation timing, resulting in longer transmission delay of the downlink signals. This may be more significant for a longer DRX cycle. Particularly, the user apparatus residing in a cell boundary may fail to receive the downlink signals with a high likelihood compared to a user apparatus residing near a base station. When the user apparatus residing in a cell boundary is communicating information associated with handover control, it is undesirable to make the above transmission delay longer.

DISCLOSURE OF INVENTION

Problem to be Solved by the Invention

In a conventional scheme, user apparatuses are assigned to DRX patterns 1-10 in such a manner that the user apparatuses can be evenly distributed over the DRX patterns 1-10. In this case, however, there is a risk that relatively longer delay may arise for user apparatuses with a relatively poor channel state.

Thus, one object of the present invention is to shorten the delay that may arise for user apparatuses with a relatively poor channel state among user apparatuses conducting the DRX.

Means for Solving the Problem

One aspect of the present invention relates to a base station apparatus, including: a classification unit configured to classify user apparatuses based on channel state of a radio link; a DRX (Discontinuous Reception) status memory configured to store information indicating which of multiple groups each of one or more of the user apparatuses conducting DRX belongs to; a determination unit configured to determine which of the groups the user apparatuses classified by the classification unit are to belong to with reference to the information stored in the DRX status memory; and an indication unit configured to indicate the determined groups to the user apparatuses, wherein each of the groups includes one or more of the user apparatuses activating simultaneously, and the determination unit is configured to assign one of the user apparatuses having relatively poor channel state to one of the groups having a smaller number of simultaneously activating user apparatuses.

ADVANTAGE OF THE INVENTION

According to the present invention, it is possible to shorten the delay that may arise for user apparatuses with a relatively poor channel state among user apparatuses conducting the DRX.

BRIEF DESCRIPTION OF DRAWINGS

FIG. 2 illustrates likelihoods of resource assignment corresponding to different numbers of user apparatuses belonging to a certain activation pattern;

LIST OF REFERENCE SYMBOLS

Figure 1:
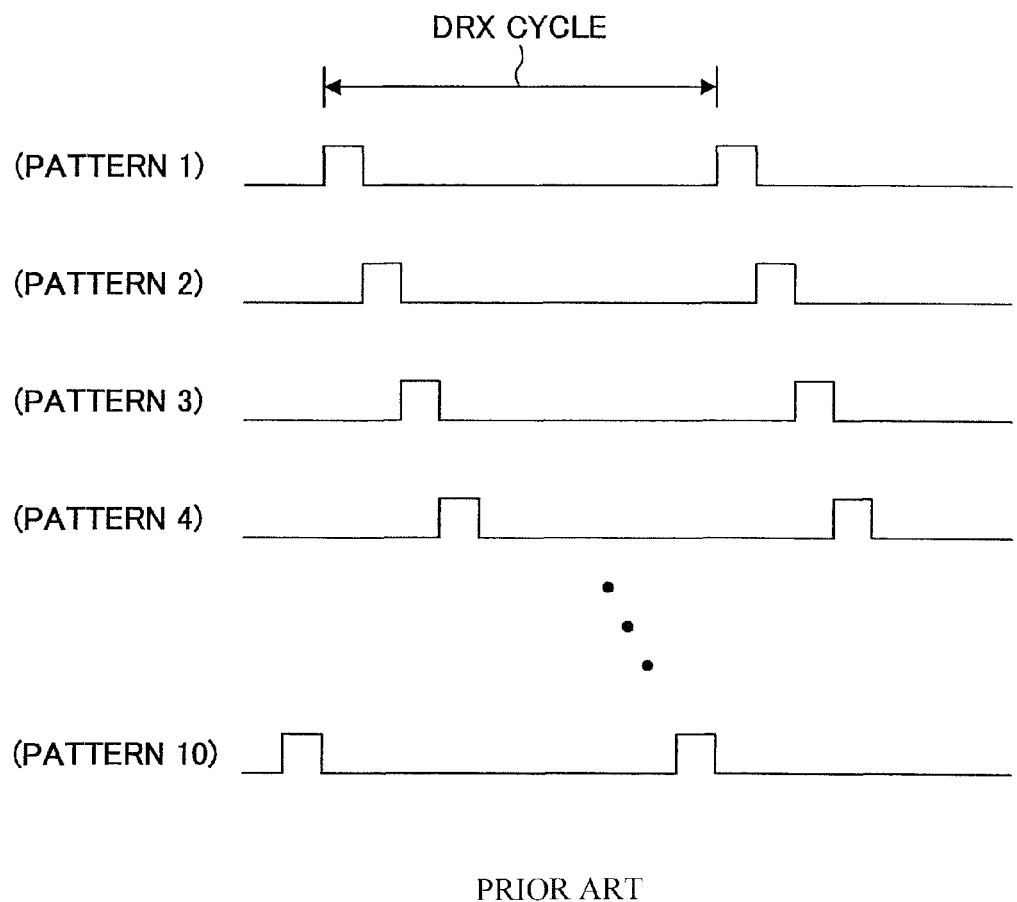
FIG. 1 schematically illustrates various DRX timing patterns.

31: radio receiving unit (RxRF)
32: channel state evaluation unit
33: determination unit
34: DRX group determination unit
35: assignment status memory
36: indicating signal generation unit
37: radio transmitting unit (TxRF)

BEST MODE FOR CARRYING OUT THE INVENTION

According to one aspect of the present invention, a user apparatus having poor channel state (user apparatus residing in cell boundary) is assigned to a group having a smaller number of simultaneously activating user apparatuses. When the user apparatus is assigned to the group having the smaller number of user apparatuses, the user apparatus could have more opportunities to have radio resources assigned in that group. In this manner, the user apparatus having poor channel state is assigned to the group, which can shorten delay that may arise for the user apparatus.

In addition, the user apparatus may be assigned to a group having a smaller number of user apparatuses having poor channel state rather than a smaller total number of user apparatuses. In general, L1/L2 control signals for the user apparatus having a poor channel state may require a larger amount of radio resources than the amount for a user apparatus having a satisfactory channel state. This may arise from utilization of a MCS having a relatively low coding rate. As a result, if a larger number of user apparatuses having poor channel states belong to the same group, a larger amount of radio resources may be used for the L1/L2 control signals for that group, resulting in reduction in the corresponding amount of radio resources available for shared data channels. In this manner, a single group is arranged to include a smaller number of user apparatuses having poor channel states. As a result, a smaller amount of radio resources can be assigned for the L1/L2 control signals used for the group, which can reserve for a larger amount of radio resources for the shared data channels.

As stated above, there is a higher risk that a user apparatus having poor channel state may fail to receive downlink signals compared to a user apparatus having satisfactory channel state. However, the user apparatus having the poor channel state could obtain more opportunities to have radio resources assigned through the assignment of a DRX group having a smaller number of user apparatuses to that user apparatus. As a result, it can be expected that the user may experience similar delay independently of channel quality or at least a difference between delays associated with the poor channel state and the satisfactory channel state may be reduced. Thus, the present invention can contribute to uniform service among different areas within a service area.

For convenience, specific values may be used. However, the specific values are simply illustrative, and other values may be used as needed.

[First Embodiment]

Figure 3:
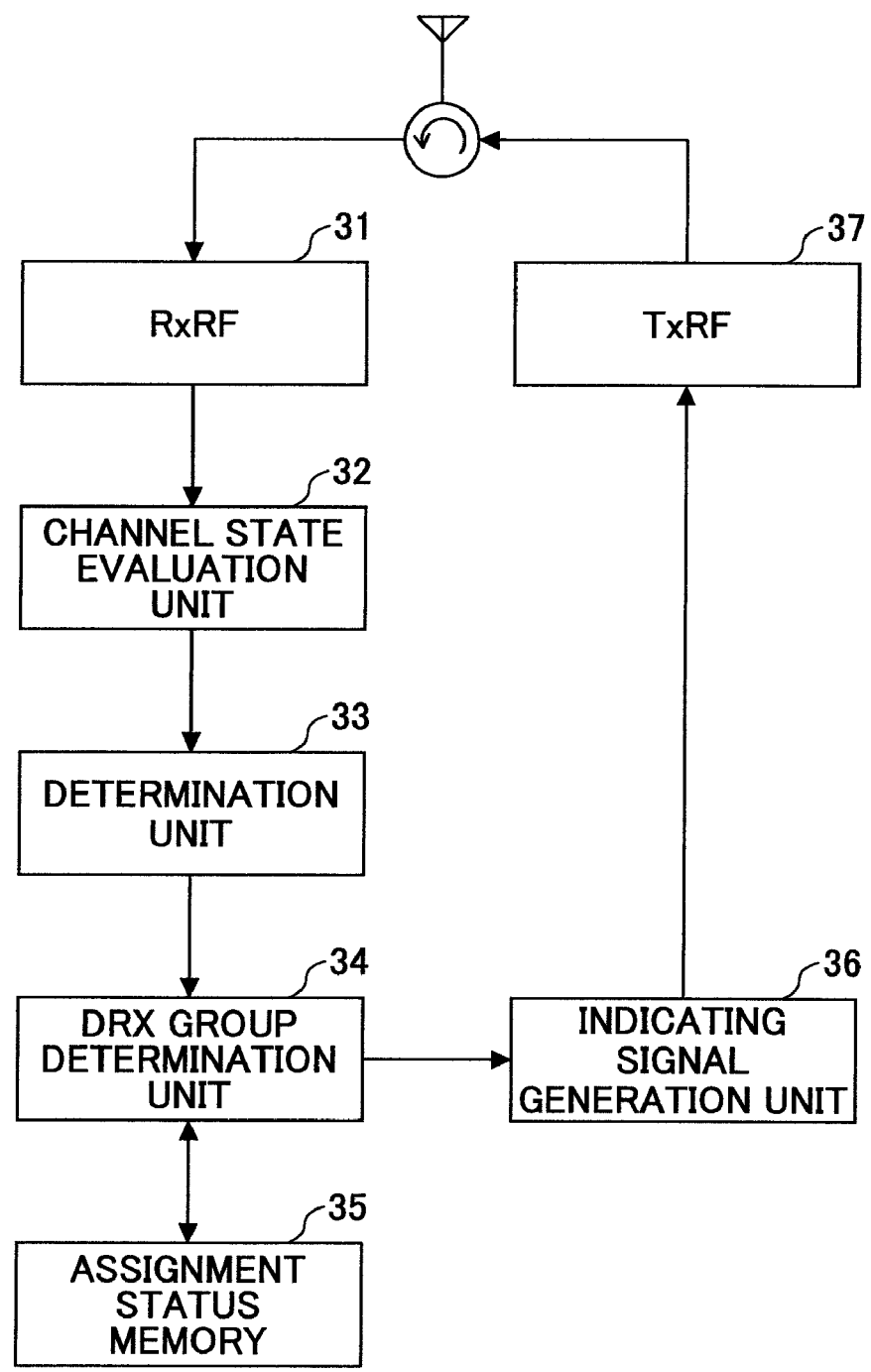
FIG. 3 is a functional block diagram illustrating a base station according to one embodiment of the present invention.

FIG. 3 is a functional block diagram illustrating a base station according to one embodiment of the present invention. In FIG. 3, a radio receiving unit (RxRF) 31, a channel state evaluation unit 32, a determination unit 33, a DRX group determination unit 34, an assignment status memory 35, an indicating signal generation unit 36 and a radio transmitting unit (TxRF) 37 are illustrated.

The radio receiving unit (RxRF) 31 performs power amplification, frequency conversion, band filtering, analog-digital conversion, decoding and demodulation and other operations on radio signals received from user apparatuses via an antenna and a duplexer. The received radio signals may include downlink reception quality information, such as a channel quality indicator (CQI) derived from a reception level for downlink reference signals, and/or uplink reference signals.

The channel state evaluation unit 32 receives the channel quality indicator indicative of downlink channel states (downlink CQI) from the user apparatuses or evaluates the channel quality indicator for uplink channel states (uplink CQI) by evaluating a reception quality SIR for the uplink reference signals received from the user apparatuses. The channel state is determined based on one or both of the downlink CQI and the uplink CQI. Strictly speaking, the channel state may be different for the uplinks and downlinks. In this embodiment, averaged channel quality is used rather than instantaneous channel quality for subsequent signal processing, and thus the channel state evaluation unit 32 may use one or both of the uplink CQI and the downlink CQI. This averaged channel quality can be obtained through passage into a low pass filter, for example. The averaged CQI cannot follow instantaneous fading but may change moderately to follow shadowing and path loss (propagation loss).

The determination unit 33 determines whether a user apparatus resides in a cell boundary based on the averaged CQI. If the averaged CQI is low, it is determined that the user apparatus resides in the cell boundary. On the other hand, if the averaged CQI is high, it is determined that the user apparatus resides near the base station.

The DRX group determination unit 34 determines which DRX group a user apparatus is to belong to based on whether the user apparatus resides in a cell boundary and current assignment status of the DRX groups. The current assignment status of the DRX groups is stored in the assignment status memory 35.

Figures 4, 5:
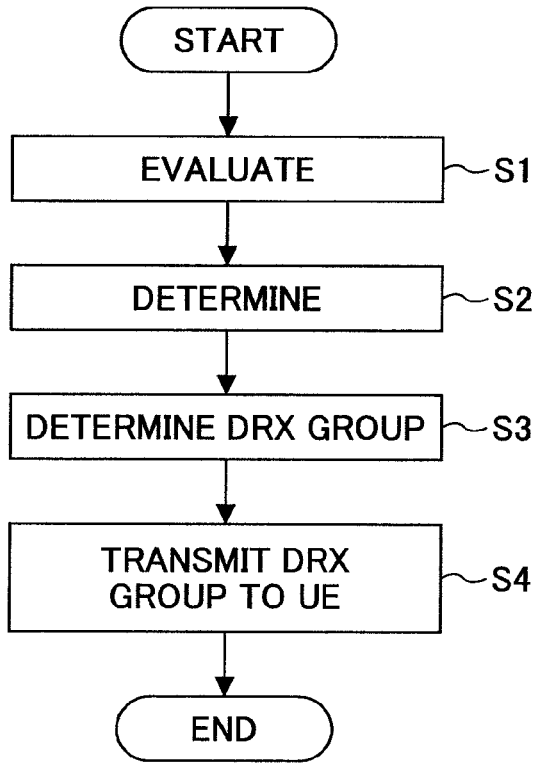
FIG. 4 schematically illustrates exemplary contents stored in an assignment status memory.
FIG. 5 is a flowchart illustrating an exemplary operation of a base station according to one embodiment of the present invention.

FIG. 4 schematically illustrates exemplary contents stored in the assignment status memory. In the illustration, "group number" corresponds to "pattern number" in FIG. 1. One or more user apparatuses belonging to a group identified by that number all conduct discontinuous reception (DRX) while switching between the active state and the inactive state at the same timings whereas user apparatuses belonging to different groups are not activated at the same timing. The illustrated right column "total number of UEs" indicates the total number of user apparatuses conducting the DRX at timings for the associated group number. The illustrated center column "number of UEs in cell boundary" indicates the number of user apparatuses residing in a cell boundary among the user apparatuses conducting the DRX at timings for the associated group number. In other words, the number of user apparatuses not residing in the cell boundary can be derived from (total number of UEs) minus (number of UEs in cell boundary).

Referring back to FIG. 3, the DRX group determination unit 34 determines which group a user apparatus of interest is to belong to based on the determination result of the determination unit 33 and the current assignment status. In this embodiment, a user apparatus residing in the cell boundary is assigned to a group having a smaller total number of user apparatuses and a smaller number of user apparatuses residing in the cell boundary. On the other hand, a user apparatus not determined to reside in the cell boundary may be assigned to a group having a smaller total number of user apparatuses.

The indicating signal generation unit 36 generates signals for indicating determined DRX groups to user apparatuses. Although the DRX groups may be indicated in any appropriate scheme, information indicative of the DRX groups may be included in data signals subsequent to L1/L2 control signals due to infrequency reassignment of the DRX groups. More specifically, the information indicative of the DRX groups may be indicated in MAC control PDUs or L3-RLC messages.

The radio transmitting unit (TxRF) 37 transmits radio signals to user apparatuses via a duplexer and an antenna. This transmission operation may include digital-analog conversion, encoding, modulation, frequency conversion, band filtering and power amplification. The radio signals may include L1/L2 control signals and data signals. The L1/L2 control signals may include information indicative of user apparatuses, resource blocks and transmission formats assigned for subsequent data signals, information indicative of user apparatuses, resource blocks and transmission formats allowed for the next uplink data transmission, and acknowledgement information (ACK/NACK) for previous uplink data. The data signals may include signals indicative of the DRX groups together with user traffic data destined for user apparatuses.

FIG. 5 is a flow chart illustrating an exemplary operation for a base station. At step S1, the base station receives channel quality indicators indicative of downlink channel state (downlink CQIs) from user apparatuses or evaluates channel quality indicators indicative of uplink channel state (uplink CQIs) by evaluating receive quality SIRs for uplink reference signals received from the user apparatuses. One or both of the downlink CQIs and the uplink CQIs are averaged. It is determined whether the channel state is satisfactory based on the averaged values. The averaging values may be obtained through passage into a low pass filter, for example.

At step S2, it is determined based on the determined channel state whether a user apparatus resides in cell boundary. If the averaged CQI for the user apparatus is not satisfactory, the user apparatus is determined to reside in the cell boundary. On the other hand, if the averaged CQI for the user apparatus is satisfactory, the user apparatus is determined to reside near the base station.

At step S3, it is determined with reference to a current group assignment status which DRX group the user apparatus is to belong to depending on whether the user apparatus resides in the cell boundary. The respective DRX groups correspond to DRX patterns corresponding to pattern numbers 1-10. All user apparatuses belonging to the same DRX group switch between the active state and the inactive state in accordance with the same DRX pattern. On the other hand, user apparatuses belonging to different DRX groups are not activated at the same timing. Thus, the total number of user apparatuses associated with a certain DRX group (group number or pattern number) may correspond to the maximum number of user apparatuses that can be multiplexed in a downlink L1/L2 control signal transmitted in accordance with the corresponding pattern.

As stated above in conjunction with step S3, a user apparatus residing in the cell boundary is assigned to s group having a smaller total number of user apparatuses and a smaller number of user apparatuses residing in the cell boundary. A user apparatus not determined to reside in the cell boundary may be assigned to a group having a smaller total number of user apparatuses. For example, in the example illustrated in FIG. 4, when the group assigned for the user apparatus residing in the cell boundary is determined, group 3 or 4 may be a candidate for the assigned group.

At step S4, the DRX pattern determined at step S3 is indicated to the user apparatus, and then the flow ends.

In the above-mentioned embodiment, ten types of DRX patterns have the same DRX cycle and duty cycle. However, the present invention can be applied to multiple DRX patters having different DRX cycles and/or different duty cycles. In addition, the present invention can be applied to multiple patterns having partially matched activation timings. In this case, for example, an averaged number of user apparatuses activating simultaneously at each activation timing may be calculated for each pattern, and DRX pattern assignments similar to the above-mentioned embodiment may be controlled based on the calculated averaged number.

The present invention have been described with reference to the specific embodiments of the present invention, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviation from the spirit of the present invention.

This international patent application is based on Japanese Priority Application No. 2007-075580 filed on Mar. 22, 2007, the entire contents of which are hereby incorporated by reference.

The invention claimed is:

1. A base station apparatus, comprising:
a classification unit configured to classify user apparatuses based on channel state of a radio link;
a DRX (Discontinuous Reception) status memory configured to store information indicating which of multiple groups each of one or more of the user apparatuses conducting DRX belongs to;
a determination unit configured to determine which of the groups the user apparatuses classified by the classification unit are to belong to with reference to the information stored in the DRX status memory; and
an indication unit configured to indicate the determined groups to the user apparatuses, wherein each of the groups includes one or more of the user apparatuses activating simultaneously, and the determination unit is configured to assign one of the user apparatuses having poor channel state to one of the groups having a smaller number of simultaneously activating user apparatuses.

2. A method for use in a base station apparatus in a mobile communication system, comprising:

classifying user apparatuses based on a channel state of a radio link;

accessing a DRX (Discontinuous Reception) status memory, referring to information indicating which of multiple groups each of one or more of the user apparatuses conducting DRX belongs to, and determining which of the groups the classified user apparatuses are to belong to; and indicating the determined groups to the user apparatuses, wherein each of the groups includes one or more of the user apparatuses activating simultaneously, and the determining comprises assigning one of the user apparatuses having poor channel state to one of the groups having a smaller number of simultaneously activating user apparatuses.

* * * * *